(12) United States Patent
Miao

(10) Patent No.: US 11,512,665 B2
(45) Date of Patent: Nov. 29, 2022

(54) LOCKING LINEAR ACTUATOR

(71) Applicant: The Boeing Company, Chicago, IL (US)

(72) Inventor: Sam Miao, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 151 days.

(21) Appl. No.: 16/826,092

(22) Filed: Mar. 20, 2020

(65) Prior Publication Data

US 2021/0293203 A1    Sep. 23, 2021

(51) Int. Cl.
| | |
|---|---|
| *F02K 1/76* | (2006.01) |
| *B64D 29/00* | (2006.01) |
| *F15B 15/26* | (2006.01) |

(52) U.S. Cl.
CPC .............. *F02K 1/766* (2013.01); *B64D 29/00* (2013.01); *F02K 1/763* (2013.01); *F15B 15/261* (2013.01)

(58) Field of Classification Search
CPC ........ F02K 1/766; F02K 1/763; F15B 15/261; F15B 15/26
See application file for complete search history.

(56) References Cited

U.S. PATENT DOCUMENTS

| | | | | |
|---|---|---|---|---|
| 5,097,748 A | * | 3/1992 | Koch ................... | F15B 15/261 91/43 |
| 5,431,085 A | | 7/1995 | Geffray | |
| 5,685,141 A | * | 11/1997 | Markstein ............. | F15B 15/264 60/204 |
| 5,826,823 A | | 10/1998 | Lymons et al. | |
| 6,487,846 B1 | | 12/2002 | Chakkera et al. | |
| 6,832,540 B2 | * | 12/2004 | Hart ..................... | F15B 15/2807 92/24 |
| 7,216,581 B2 | * | 5/2007 | McAuley ................ | F02K 1/763 244/102 SL |
| 8,505,307 B2 | * | 8/2013 | Wang ....................... | F02K 1/09 244/11 OB |
| 8,505,399 B2 | * | 8/2013 | Hirai .................... | F16H 25/2454 74/39 |
| 8,978,356 B2 | * | 3/2015 | Burgess .................... | F02K 1/16 60/226.2 |
| 9,188,081 B2 | | 11/2015 | Wingett et al. | |
| 9,944,385 B2 | * | 4/2018 | Lee ........................ | F15B 15/261 |
| 2014/0090551 A1 | | 4/2014 | Roberts | |
| 2018/0335115 A1 | | 11/2018 | Hawksworth et al. | |

OTHER PUBLICATIONS

European Patent Office, Extended European Search Report regarding European Patent Application No. 21163645.1, dated Aug. 2, 2021, 9 pages.

* cited by examiner

*Primary Examiner* — Todd E Manahan
*Assistant Examiner* — Thuyhang N Nguyen
(74) *Attorney, Agent, or Firm* — Kolisch Hartwell, P.C.

(57) ABSTRACT

Locking linear actuators, thrust reversers for aircraft that include the locking linear actuators, and methods of manufacturing the locking linear actuators. The disclosed locking linear actuators include an actuator housing that defines a bore housing an actuator piston and a lock sleeve. A portion of the actuator piston defines a lock aperture, housing a locking tab capable of radial movement. When the actuator is retracted, the locking tab engages with a step in the surface of the bore to lock the linear actuator, a distal portion of the lock sleeve extends into a portion of the actuator piston to prevent the locking tab from disengaging from the step in the surface of the bore.

20 Claims, 9 Drawing Sheets

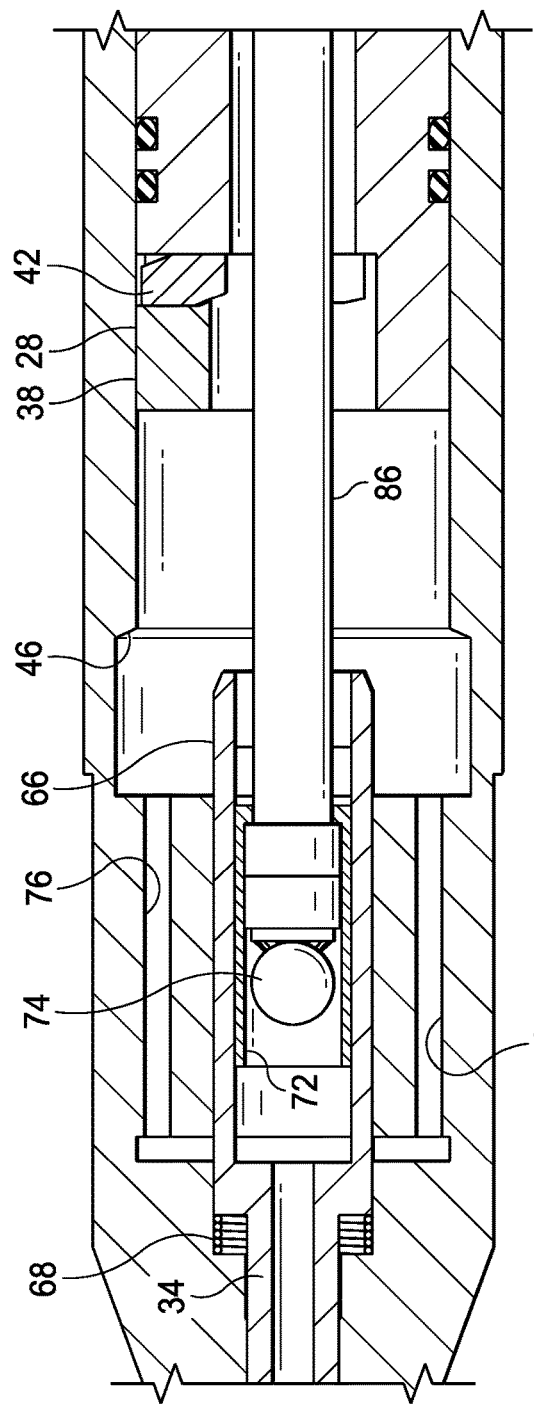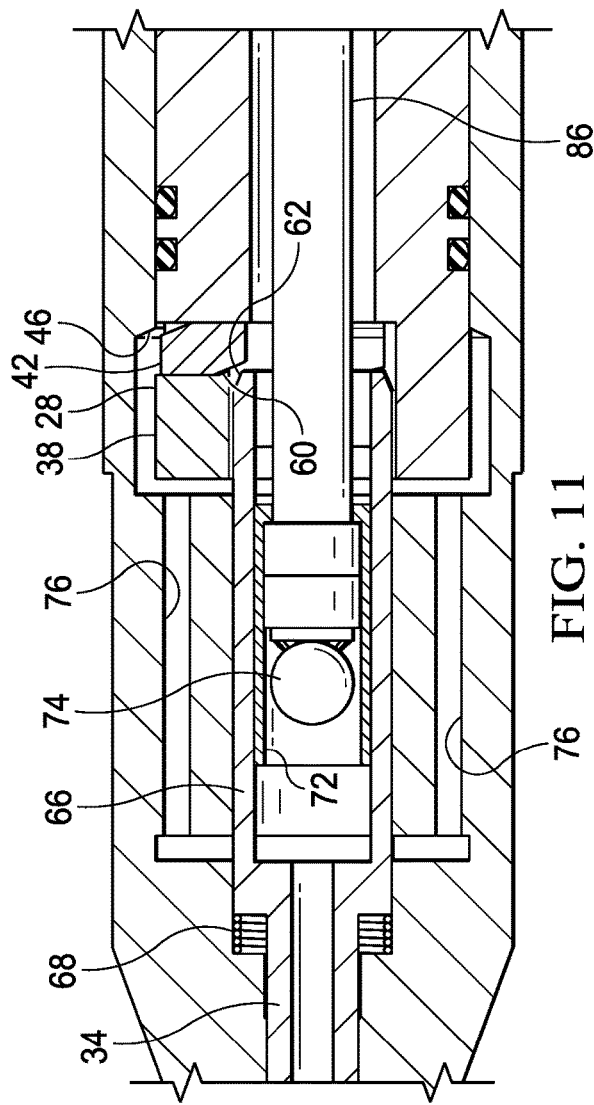

LOCKING LINEAR ACTUATOR

FIELD

This disclosure relates to hydraulic linear actuators. More specifically, the disclosure relates to locking linear actuators that can be used to deploy thrust reversers on aircraft.

INTRODUCTION

Commercial jet aircraft typically employ thrust reversal, or reverse thrust, during landings to help slow the aircraft after touch-down. By temporarily diverting either jet exhaust or bypass air forward, thrust reversal can provide rapid deceleration, permitting shorter landing distances and also reducing the wear experienced by brake systems.

There are three major types of thrust reverser systems: Target-type thrust reversers, clam-shell (or cascade) thrust reversers, and cold stream thrust reversers. Each type of system operates by redirecting at least a portion of engine thrust in a substantially forward direction. The target-type thrust reverser employs hydraulic actuators to deploy a pair of 'bucket' type doors that redirect the exhaust stream from the engines forward.

Current thrust reversers employ hydraulic actuators that are fitted with locking mechanisms, in order to prevent inadvertent actuation, and lock indicators so that the status of the actuator lock can be readily determined. Unfortunately, the current actuators are relatively bulky, and include a large number of cooperating parts, creating disadvantages with respect to maintenance and service as well as component weight. In addition, the lock indicator system of the current actuators can in some instances create mechanical wear on the locking mechanism of the actuator, necessitating more frequent service and replacement.

SUMMARY

The present disclosure provides locking linear actuators, thrust reversers employing locking linear actuators, and methods of manufacturing locking linear actuators.

In some examples, the present disclosure relates to locking linear actuators that include an actuator housing that defines an internal longitudinal bore, an actuator piston disposed in the internal longitudinal bore, where the actuator piston is configured to slidably move between a proximal retracted position and a distal extended position, and a lock sleeve disposed in the internal longitudinal bore where the lock sleeve is configured to slidably move between a distal locking position and a proximal unlocked position. In addition, when the actuator piston is in the retracted position and the lock sleeve is in the locking position, a distal portion of the lock sleeve extends into a proximal portion of the actuator piston and prevents the actuator piston from leaving the retracted position.

In some examples, the present disclosure relates to a thrust reverser for an aircraft engine, where the thrust reverser includes an aircraft engine nacelle having at least one deployable thrust reverser, and at least one linear actuator within the aircraft engine nacelle that is coupled to the deployable thrust reverser so that deploying the thrust reverser includes extending the at least one linear actuator. The linear actuator includes an actuator housing that defines a internal longitudinal bore, an actuator piston disposed in the internal longitudinal bore that is configured to slidably move between a proximal retracted position and a distal extended position, and a lock sleeve disposed in the internal longitudinal bore that is configured to slidably move between a distal locking position and a proximal unlocked position. Additionally, when the actuator piston is in the retracted position and the lock sleeve is in the locking position, a distal portion of the lock sleeve extends into a proximal portion of the actuator piston to prevent the actuator piston from leaving the retracted position.

In some examples, the present disclosure relates to a method of manufacturing a locking linear actuator. The method includes manufacturing an elongate actuator housing, where the actuator housing defines an internal longitudinal bore, installing an actuator piston within the internal longitudinal bore, so that the actuator piston is slidably moveable between a proximal retracted position and a distal extended position, and installing a lock sleeve within the internal longitudinal bore proximal to the actuator piston, so that the lock sleeve is slidably moveable between a distal locking position and a proximal unlocked position, so that when the actuator piston is in the retracted position and the lock sleeve is in the locking position, a distal portion of the lock sleeve extends into a proximal portion of the actuator piston to prevent the actuator piston from leaving the retracted position.

Features, functions, and advantages can be achieved independently in various examples of the present disclosure, or can be combined in yet other examples, further details of which can be seen with reference to the following description and drawings.

BRIEF DESCRIPTION OF THE DRAWINGS

FIG. 10 illustrates the movement of the actuator piston of the locking linear actuator of FIG. 4, when the lock sleeve is in the proximal position.

FIG. 11 illustrates the actuator piston of the locking linear actuator of FIG. 4 returned to the proximal position prior to the engagement of the lock sleeve and outward movement of the locking tabs.

DETAILED DESCRIPTION

Figure 1:
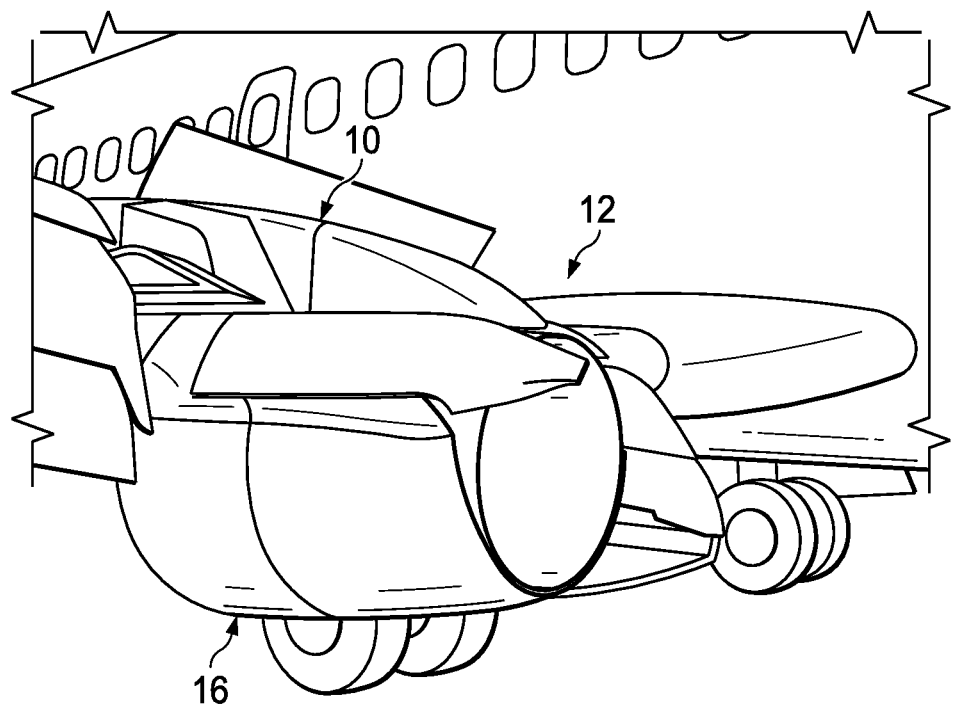
FIG. 1 depicts a representative jet engine nacelle, with thrust reverser doors retracted (stowed).

Various aspects and examples of locking linear actuators, thrust reverser systems incorporating the locking linear actuators, and methods of manufacturing locking linear actuators are described below and illustrated in the associated drawings. Unless otherwise specified, the locking linear actuators, thrust reverser systems, and methods of manufacture, their individual steps and variations may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein may be included in other similar devices and methods, including being interchangeable between disclosed examples. The following description of various examples is merely illustrative in nature and is in no way intended to limit the examples, their applications, or their uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Methods of Manufacture; (5) Illustrative Combinations and Additional Examples; (6) Advantages, Features, and Benefits; and (6) Conclusion.

(1) Definitions

The following definitions apply herein, unless otherwise indicated.

"Substantially" means to be predominantly conforming to the particular dimension, range, shape, concept, or other aspect modified by the term, such that a feature or component need not conform exactly, so long as it is suitable for its intended purpose or function.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, in the order they are introduced in a particular context and are not intended to show serial or numerical limitation, or be fixed identifiers for the group members.

"Coupled" means to be in such relation that the performance of one influences the performance of the other, may include being connected, either permanently or releasably, whether directly or indirectly through intervening components, and is not necessarily limited to physical connection(s).

(2) Overview

The locking linear actuators of the present disclosure may offer enhanced utility in any application where a linear hydraulic actuator is utilized, and in particular those applications where it may be advantageous to employ a hydraulic linear actuator having a smaller profile, fewer moving parts, an enhanced locking mechanism, and an enhanced lock sensor. Selected representative applications can include manufacturing, construction, agriculture, and commercial transportation, particularly the use of linear actuators in commercial aircraft. Although the locking linear actuators of the present disclosure will primarily be discussed in the context of thrust reverser systems of commercial aircraft, this should not be considered to limit the utility or applicability of the present locking linear actuators in any way.

Figure 2:
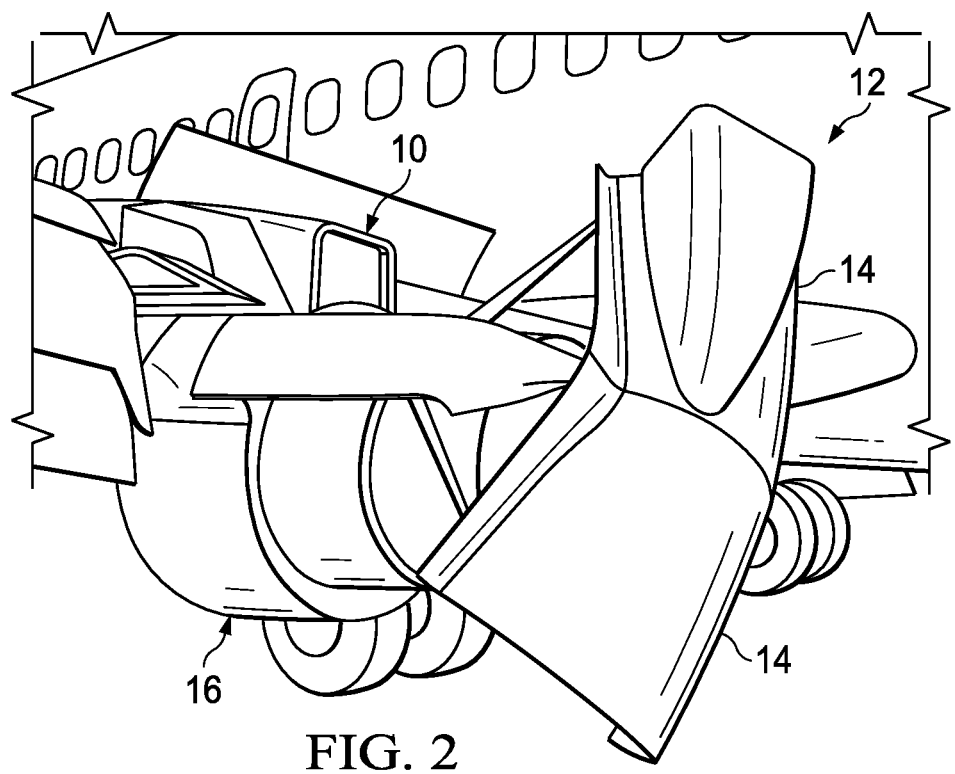
FIG. 2 depicts the jet engine nacelle of FIG. 1, with thrust reverser doors deployed (actuated) to divert the jet engine exhaust in a direction having a forward component.
Figure 3:
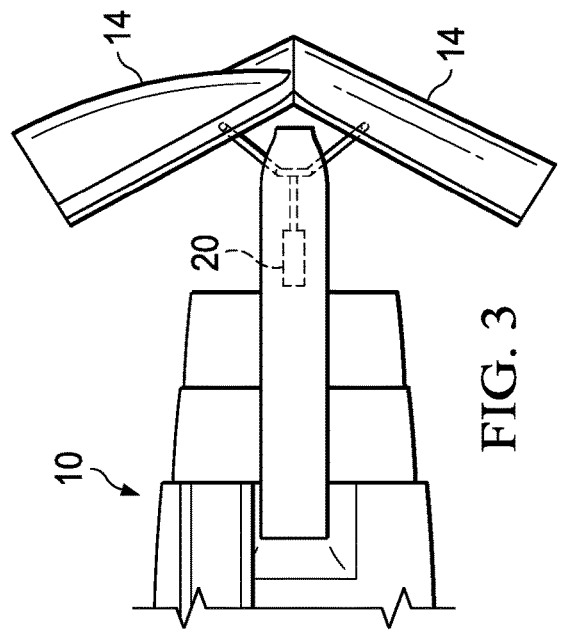
FIG. 3 schematically depicts a locking linear actuator coupled to the thrust reverser panels of a thrust reverser system.

The rear nozzle portion of a representative turbofan jet engine nacelle 10 is shown in FIGS. 1 and 2. The representative jet engine nacelle 10 includes a target-type thrust reverser system 12 that has two thrust reverser doors or panels 14 as shown in their retracted or stowed positions in FIG. 1, and in their actuated or deployed positions in FIG. 2. The thrust reverser panels 14 are coupled to jet engine 16 of nacelle 10 by one or more locking linear actuators 20, as depicted semi-schematically in FIG. 3, and the overall performance of the thrust reverser can be improved by incorporation of one or more aspects of the construction and features of the presently disclosed locking linear actuators.

(3) Examples, Components, and Alternatives

Figure 4:
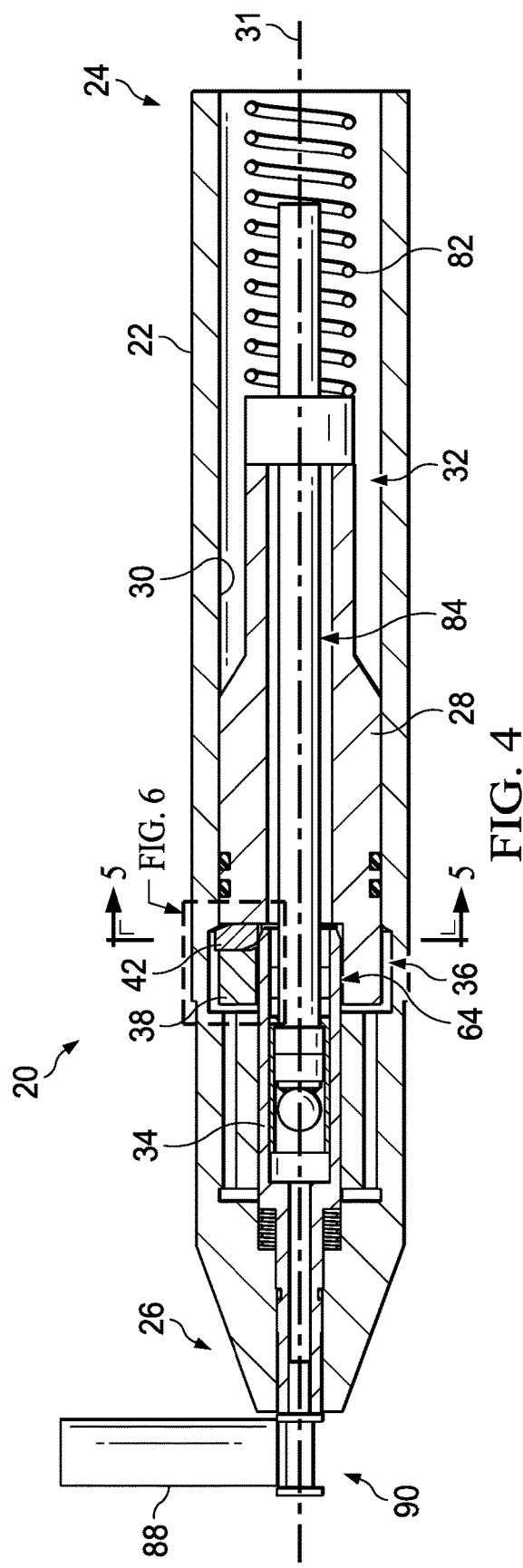
FIG. 4 depicts an illustrative locking linear actuator according to the present disclosure.

A representative locking linear actuator 20 is depicted in FIG. 4, as a longitudinal and vertical cross-section view. The locking linear actuator 20 includes an elongate actuator housing 22 that encloses and secures the linear actuator mechanism. Actuator housing 22 has a distal end 24 and a proximal end 26, where proximal end 26 is directly or indirectly attached to jet engine 16 and/or a jet engine nacelle 10. An actuator piston 28 is disposed within an internal longitudinal bore 30 defined by actuator housing 22, and having a longitudinal bore axis 31. A distal end 32 of actuator piston 28 can be directly or indirectly coupled to a panel 14 of a thrust reverser system 12. Actuator piston 28 can be configured so that the actuator piston is slidably disposed within internal longitudinal bore 30, and is therefore capable of slidably moving between a proximal position, corresponding to thrust reverser panel 14 being retracted or stowed, and a distal position, corresponding to thrust reverser panel 14 being extended or deployed.

Also disposed within internal longitudinal bore 30, in a position that is proximal to actuator piston 28, is a lock sleeve 34. Similar to actuator piston 28, lock sleeve 34 is configured to slidably translate within internal longitudinal bore 30 between a distal locking position and a proximal unlocked position.

With reference to FIG. 4, the actuator piston 28 and the lock sleeve 34 are configured such that, when the actuator piston 28 is in the retracted position and the lock sleeve 34 is in the locking position, a distal portion 64 of the lock sleeve extends into a proximal portion 36 of the actuator piston to prevent the actuator piston 28 from leaving the retracted position.

Figure 5:
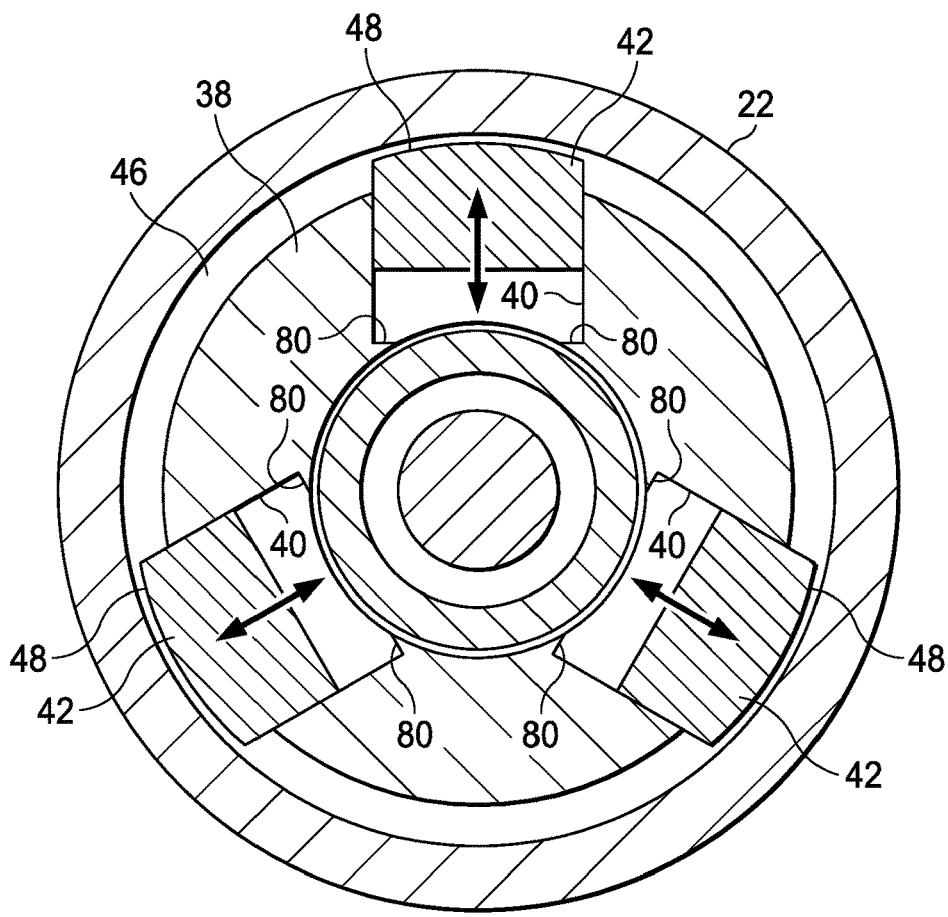
FIG. 5 is a cross-sectional view of the locking linear actuator as indicated in FIG. 4.

At least a proximal portion 36 of actuator piston 28 defines a substantially cylindrical piston sidewall 38. Cylindrical piston sidewall 38 defines at least one lock aperture 40 that extends through the cylindrical piston sidewall. A locking tab 42 is movably disposed in the lock aperture 40, and both locking tab 42 and lock aperture 40 are sized and shaped so that locking tab 42 can readily translate radially within lock aperture 40. As shown for a circular cross-section of cylindrical piston sidewall 38 in FIG. 5, locking tab 42 can translate inwardly and/or outwardly along a radius of the circle defined by the cross-section. In the illustrative example of FIG. 5, representative cylindrical piston sidewall 38 defines three lock apertures 40 that are disposed 120 degrees apart. As shown, the three corresponding locking tabs 42 are in their radially outermost positions.

Figure 6:
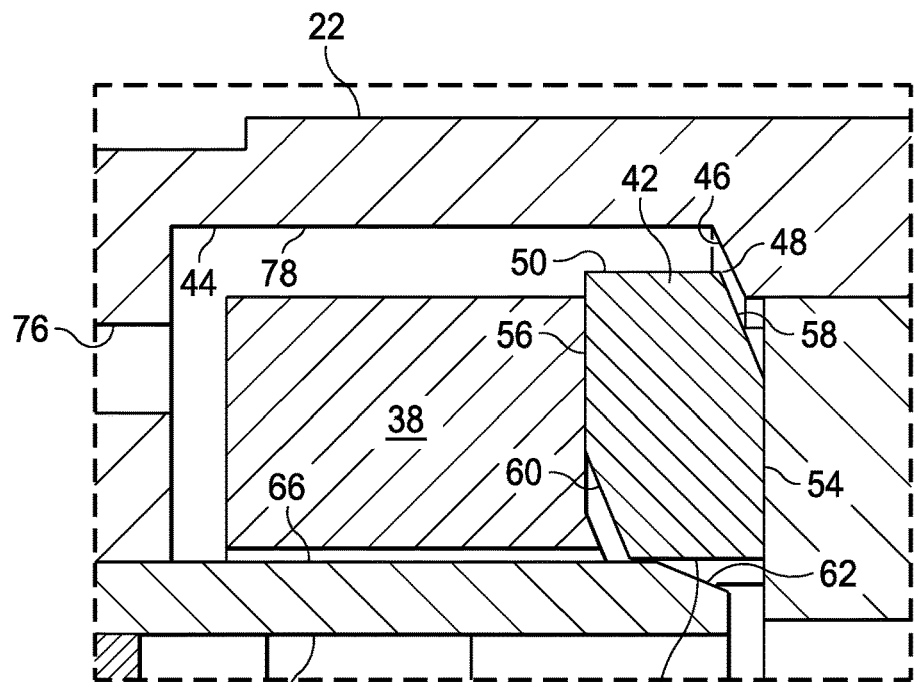
FIG. 6 is a detailed view of the locking tab, lock aperture, and distal portion of the lock sleeve of the locking linear actuator of FIG. 4.

Cylindrical piston sidewall 38 is surrounded by an inner surface 44 of internal longitudinal bore 30 in actuator housing 22. As shown in FIGS. 5 and 6, inner surface 46 can be configured to define a step 46, where step 46 is defined as any feature that a corresponding locking tab 42 can positively interact with while in their radially outermost positions. As shown for representative and exemplary locking linear actuator 20, step 46 can have the form of a circumferential ledge around the entire inner surface 44, and the defined step 46 can include a surface orthogonal to longitudinal bore axis 31, or can be angled with respect to longitudinal bore axis 31, as shown. Step 46 can be continuous or intermittent, provided that a step is disposed at the one or more positions suitable for interacting with locking tabs 42. Any configuration of step 46 and locking tabs 42 that provides a positive interaction between actuator piston 28 and actuator housing 22 can be a useful configuration.

Step 46 can be positioned and shaped so that when actuator piston 28 is in the proximal and retracted position, and locking tab 42 is disposed radially outwardly sufficiently, that an outer edge of locking tab 42 extends sufficiently beyond lock aperture 40 that outer edge 48 engages step 46 in inner surface 44. As locking tab 42 is engaged with step 46, and actuator piston 28 is engaged with locking tab 42 via lock aperture 40, actuator piston 28 is prevented from translating out of the proximal and retracted position. In this configuration, actuator piston 28 is locked in place, and linear actuator 20 as a whole can be described as being locked.

Locking tab 42, and its outer edge 48, may also have any suitable shape and configuration. In the example depicted in FIGS. 5 and 9, outer edge 48 of locking tab 42 is curved so as to provide a strong interaction with the curve of step 46. The outer edge can be more or less curved, or even exhibit no curvature, provided locking tab 42 can engage positively with step 46. As shown in greater detail in FIG. 6, locking tab 42 also defines an outer face 50, an inner face 52, a distal face 54 and a proximal face 56. Locking tab 42 can further include an outer chamfered edge 58, that can be angled to be complementary to the angle of step 46. Additionally, when locking tab 42 is urged outwardly during locking, the interaction of outer chamfered edge 58 with step 46 helps to seat actuator piston 28 in the locked configuration. Similarly, locking tab 42 can include an inner chamfered edge 60, that can be angled to be complementary to a chamfered edge 62 on lock sleeve 34, so that an interaction between chamfered edge 62 of the lock sleeve and inner chamfered edge 60 of the locking tab when lock sleeve is being urged in the distal direction will help to seat locking tab 42 against step 46.

Figure 7:
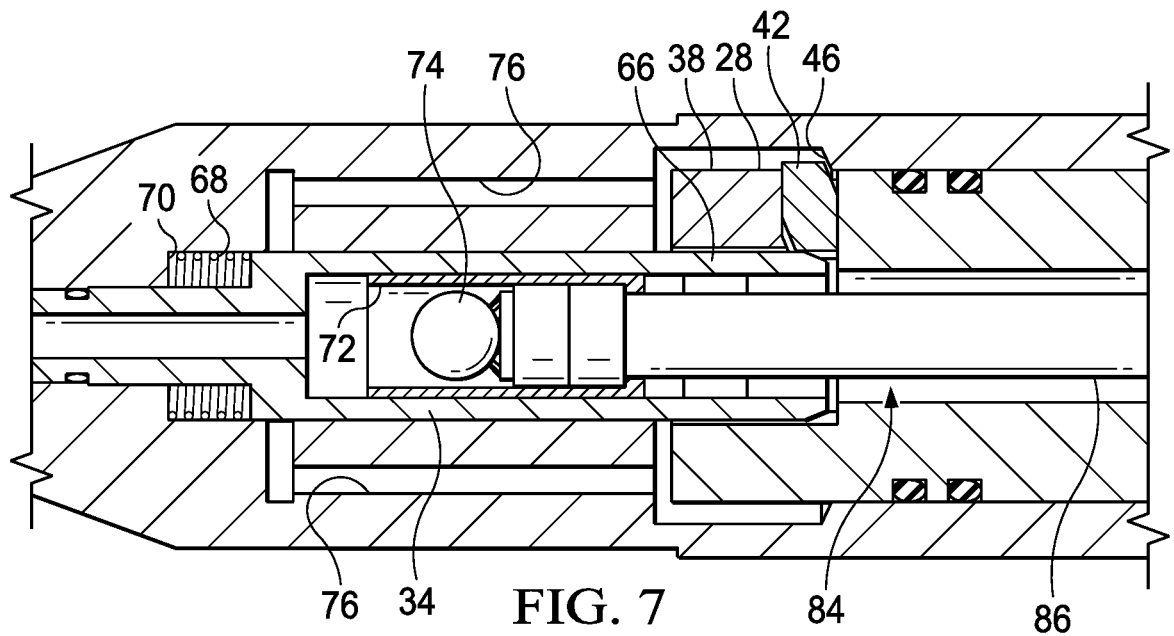
FIG. 7 illustrates the hydraulic space defined within the locking linear actuator of FIG. 4.

The locked configuration of linear actuator 20, as shown in FIGS. 4 and 7, can be secured and maintained by an appropriate positioning of lock sleeve 34. A distal portion 64 of lock sleeve 34 can define a cylindrical sleeve sidewall 66 that is sized and shaped so that cylindrical sleeve sidewall 66 can be inserted, or nested, concentrically within cylindrical piston sidewall 38 of actuator piston 28 when lock sleeve 34 is in the distal and locked position. In this configuration, cylindrical sleeve sidewall 66 prevents each locking tab 42 from moving radially inward within its respective lock aperture 40, and therefore prevents each locking tab 42 from disengaging with step 46 in inner surface 44 of internal longitudinal bore 30. Lock sleeve 34 can be kept in the distal and locking position by any appropriate lock sleeve biasing mechanism 68, for example such as a lock sleeve biasing spring that can be positioned between a proximal surface 70 within internal longitudinal bore 30 and lock sleeve 34, and therefore acts by continuously urging lock sleeve 34 in a distal direction and therefore toward the locking position, keeping linear actuator 20 locked, and preventing the actuator from deploying.

Actuator housing 22 defines an internal hydraulic space 72 that is in fluid communication with internal longitudinal bore 30, as shown in FIG. 6. Hydraulic space 72 encloses a synchronization screw 74 that can regulate the flow of pressurized hydraulic fluid into hydraulic space 72 from a suitable source, such as a large hydraulic system providing power to multiple aircraft systems, or a smaller, closed-circuit hydraulic system dedicated to the thrust reverser system, or to even a single linear actuator.

Actuator housing 22 can additionally define one or more channels 76 in fluid communication with both hydraulic space 72 and a region 78 of internal longitudinal bore 30 that includes the one or more steps 46, as shown in FIG. 6. When linear actuator 20 is locked, region 78 encloses the proximal portion 36 of actuator piston 28, including the outer faces 50 of the one or more locking tabs 42, which are being retained in engagement with step 46 by the presence of cylindrical sleeve sidewall 66 of lock sleeve 34. As long as lock sleeve 34 maintains the distal locking position, locking tabs 42 are prevented from moving inwardly, and actuator piston 28 remains in the locked configuration.

Figure 8:
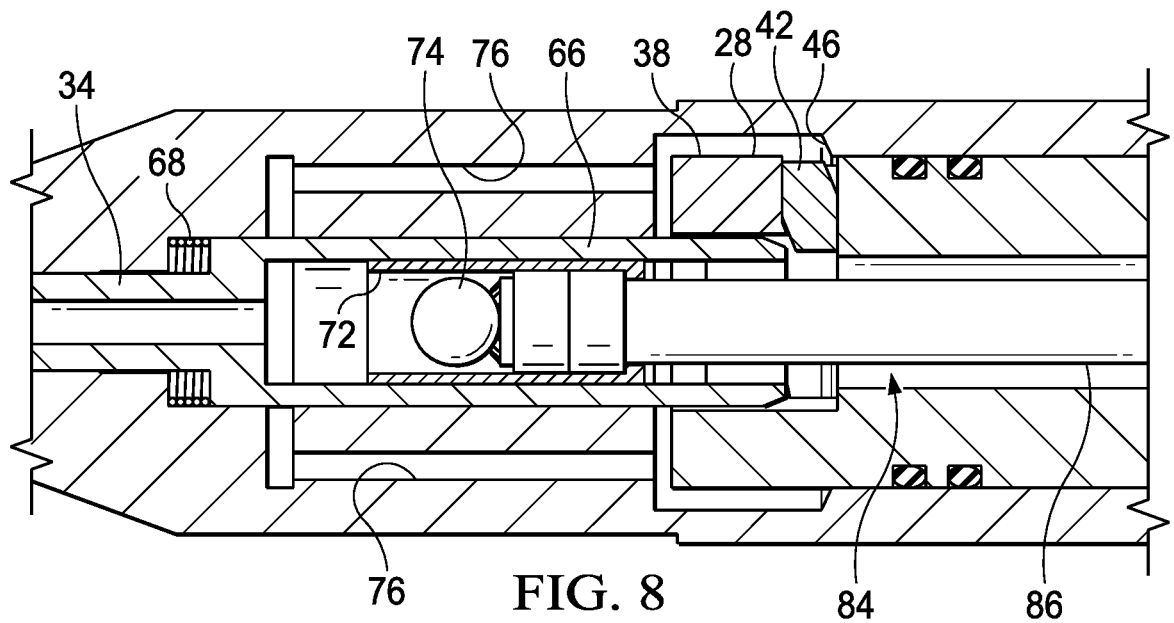
FIG. 8 illustrates the initial movement of the lock sleeve upon actuation of the locking linear actuator of FIG. 4.

In order to unlock and deploy linear actuator 20, hydraulic pressure can be increased within hydraulic space 72. As hydraulic pressure within hydraulic space 72 increases, the increased pressure urges lock sleeve 34 to translate in the proximal direction against the force applied by lock sleeve biasing mechanism 68. As the increased hydraulic pressure becomes greater than the force applied against lock sleeve 34 by lock sleeve biasing mechanism 68, lock sleeve 34 is urged in the proximal direction. Distal cylindrical sleeve sidewall 66 of lock sleeve 34 is therefore retracted from its nested position within cylindrical actuator piston cylindrical piston sidewall 38. FIG. 8 shows linear actuator 20 with lock sleeve 34 urged into the proximal unlocked configuration.

Figure 9:
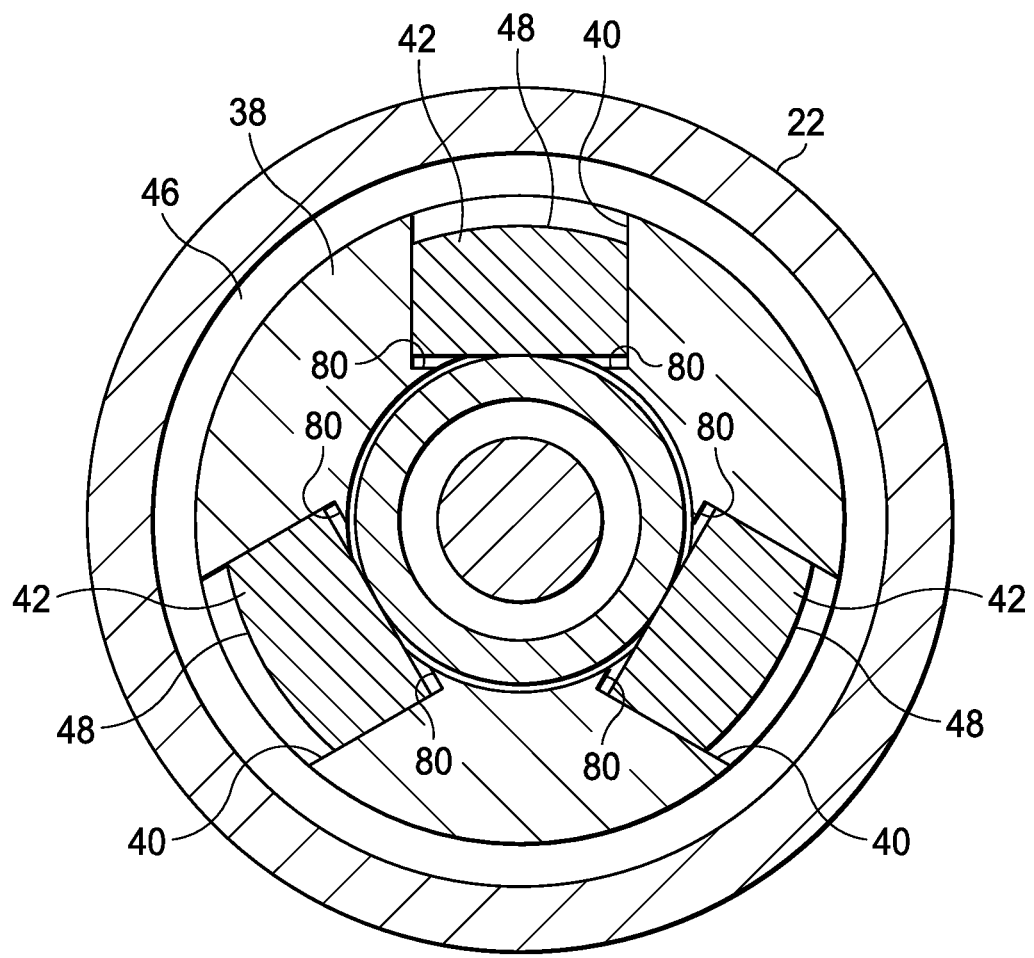
FIG. 9 is the cross-sectional view of FIG. 5, showing the inward translation of the locking tabs of the locking linear actuator of FIG. 4.

Due to the presence of channel 76, the pressure in hydraulic space 72 also creates increased pressure in region 78 of internal longitudinal bore 30. This increased pressure urges actuator piston 28 in the distal direction within internal longitudinal bore 30, which urges locking tabs 42 to move inwardly, as well as exerting pressure on outer face 50 of each locking tab 42 directly. Once lock sleeve 34 has translated to the unlocked configuration it no longer prevents the inward motion of locking tabs 42, and each locking tab 42 moves inwardly until stopped. For the illustrative apparatus of FIG. 9, for example, each locking tab 42 can move inwardly until it abuts an internal stop 80 defined by lock aperture 40. Locking tab 42 is configured and sized so that once it is in contact with internal stop 80, locking tab 42 no longer protrudes from lock aperture 40, and is no longer engaged with step 46, as shown in FIGS. 8 and 9.

As soon as locking tabs 42 are fully disengaged from step 46, the increased hydraulic pressure existing within hydraulic space 72 immediately urges actuator piston 28 in the distal direction, resulting in the translation of actuator piston 28 to the distal position, resulting in the thrust reverser panel 14 that is coupled to actuator piston 28 being deployed, as shown in FIG. 10.

As shown, lock sleeve 34 is permitted a smaller range of travel between the locking and unlocked positions than is required for actuator piston 28 when translating from proximal position to distal position. As a result, under the influence of hydraulic pressure lock sleeve 34 can translate very quickly to the unlocked configuration. The movement of actuator piston 28 is typically slower, due to its greater size and mass, and greater range of travel.

The locking linear actuator 20, and therefore its associated thrust reverser panel 14, can be returned to the stowed configuration by reducing the pressure of the hydraulic fluid being provided to hydraulic space 72. With the reduction of internal pressure, actuator piston 28 is urged back to the original proximal position by the action of an actuator piston biasing mechanism 82, which can be any suitable biasing mechanism, such as an actuator piston biasing spring, among others. Actuator piston biasing mechanism 82 can be at least somewhat stronger than lock sleeve biasing mechanism 68 for lock sleeve 34 in order to help ensure that actuator piston 28 returns to the proximal position before lock sleeve 34 is urged into the distal, locked position. As shown in FIG. 11, actuator piston 28 has been returned to the proximal position, but locking tabs 42 remain within lock apertures 40. As lock sleeve 34 is urged by lock sleeve biasing mechanism 68 to the locked position, the chamfered edge 62 of lock sleeve 34 can interact with chamfered edge 60 of locking tab 42, which then urges each locking tab 42 outward to engage with step 46.

The operation of locking linear actuator 20 can be coordinated with one or more additional locking linear actuators using a synchronization coupling 84. Synchronization coupling 84 (FIGS. 4, 7, and 8) can include a flexible-shafted cable 86 (FIGS. 7 and 8) that couples the operation of synchronization screw 74 (FIGS. 7, 8, 10, and 11) with the synchronization screws of those additional locking linear actuators in order to coordinate operation. The synchronization coupling 84 can be configured to ensure that where multiple locking linear actuators are operating in a single thrust reverser system, that the thrust reverser panels are moved in a substantially synchronized manner. That is, when one thrust reverser panel is moved, any other thrust reverser panel in the same thrust reverser system is moved an equivalent distance at substantially the same time. Other mechanical systems to synchronize linear actuator operation can include any other appropriate linkage in order to coordinate operation of coupled linear actuators.

The operation of locking linear actuator 20 can be monitored by a sensor 88 disposed adjacent the proximal end 26 of actuator housing 22, where sensor 88 can be configured to detect an associated sensor target 90 that can be coupled to proximal end 92 of lock sleeve 34. Various combinations of sensor and sensor target can be useful in the context of the present disclosure. Any suitable sensing technology can be used for the sensor target and sensor of locking linear actuator 20, such as capacitive sensing, inductive sensing, optical sensing, magnetic sensing, among others.

Figure 12:
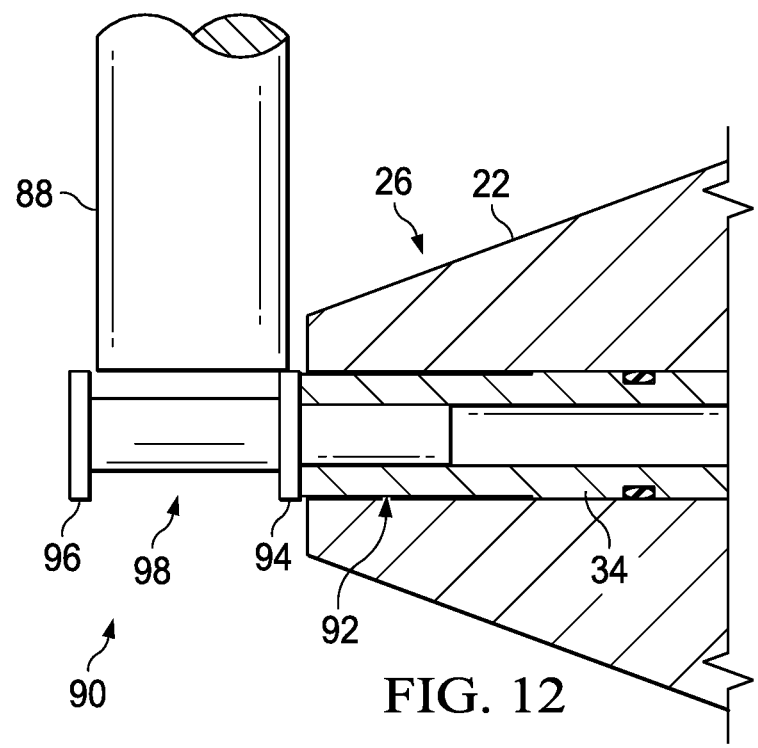
FIG. 12 depicts the sensor and sensor target of the locking linear actuator of FIG. 4 when the linear actuator is locked.
Figure 13:
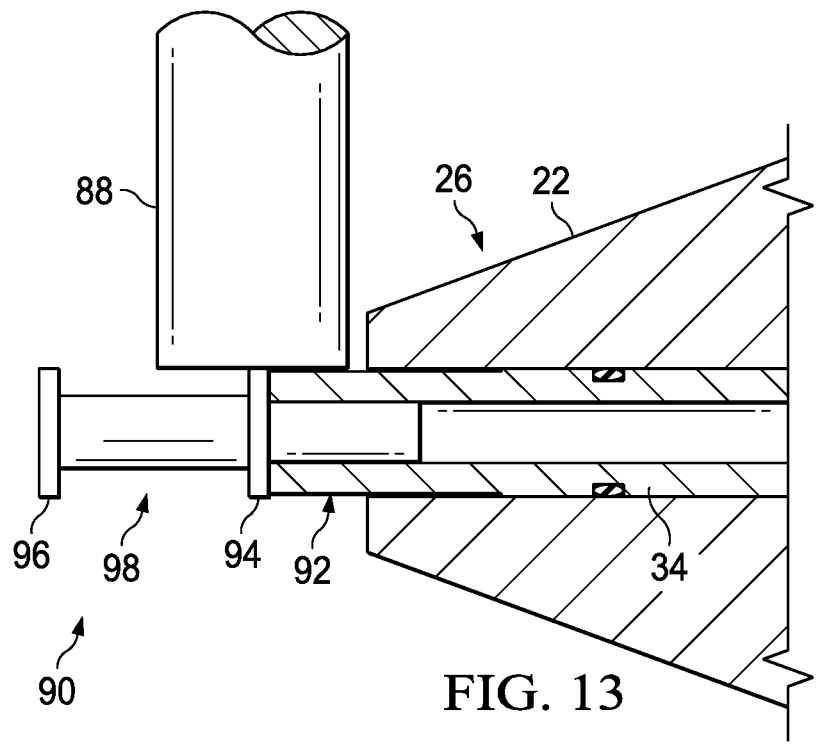
FIG. 13 depicts the sensor and sensor target of the locking linear actuator of FIG. 4 when the linear actuator is unlocked.

Sensor target 90 can include two sensor activation regions 94 and 96, and a sensor deactivation region 98. As illustrated in FIGS. 12 and 13, sensor 88 can be a type of metal detector, and sensor target 90 can include two metallic disks which, when adjacent to sensor 88 (i.e. centered beneath the sensor) can activate or trigger the sensor. Deactivation region 98 then corresponds to a region between the metallic disks, which when disposed adjacent to sensor 88 does not trigger the sensor.

When linear actuator 20 is in the locked configuration, as shown in FIG. 12, sensor 88 is aligned with and adjacent to deactivation region 98. Sensor 88 is not activated, and the result is a signal that the locking linear actuator is in the locked configuration. In practical terms, this configuration can signal to a flight crew that the thrust reverser system coupled to the linear actuator is stowed and locked.

When linear actuator 20 is the unlocked configuration, as shown in FIG. 13, lock sleeve 34 is in the proximal unlocked position, and sensor activation region 94 is aligned with and adjacent to sensor 88. Sensor 88 is activated, and the result is a signal indicating that the locking linear actuator is in the unlocked configuration, and is deploying. This configuration can signal the flight crew that the thrust reverser system coupled to the linear actuator is deployed or in the process of deploying.

Figure 14:
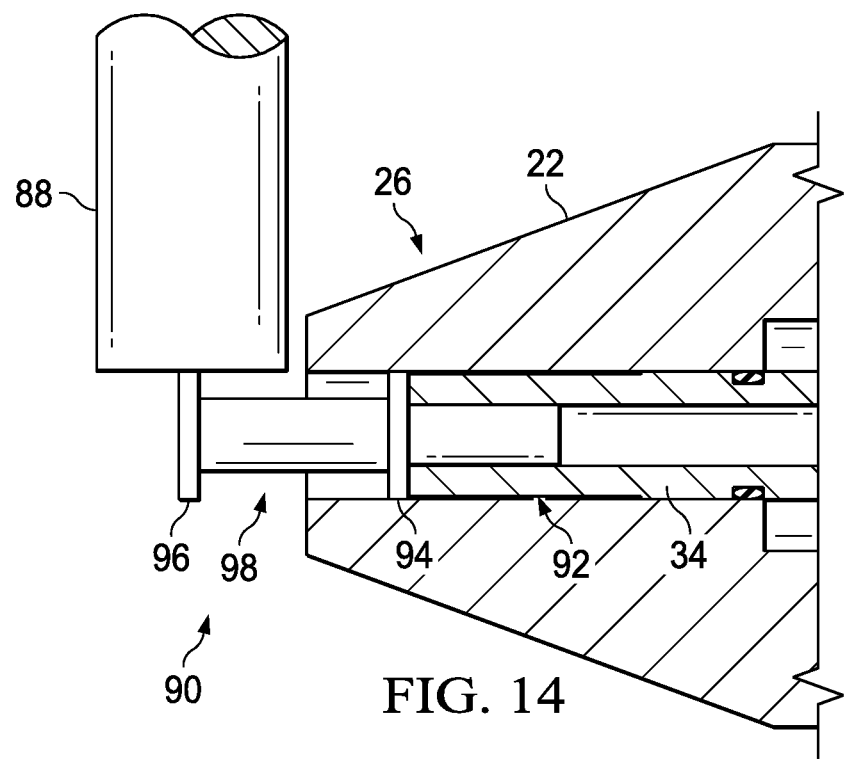
FIG. 14 depicts the sensor and sensor target of the locking linear actuator of FIG. 4 when the linear actuator is unlocked and being stowed.

Because lock sleeve 34 is more responsive to changes in hydraulic pressure, and able to translate more rapidly than actuator piston 28, when linear actuator 20 is in the process of being stowed or retracted, lock sleeve 34 may be urged in the distal direction beyond the locked configuration, until the actuator piston 28 is seated in the locked configuration and urges lock sleeve 34 into the locked configuration. This configuration of sensor target 90 is shown in FIG. 14. As sensor activation region 96 is adjacent to sensor 88, sensor 88 generates a signal indicating that the locking linear actuator is in the unlocked configuration, but is being stowed or retracted. Once the locking linear actuator is fully retracted and locked, sensor 88 should again align with sensor deactivation region 98, and signal that the linear actuator is locked and stowed.

(4) Methods of Manufacture

Figure 15:
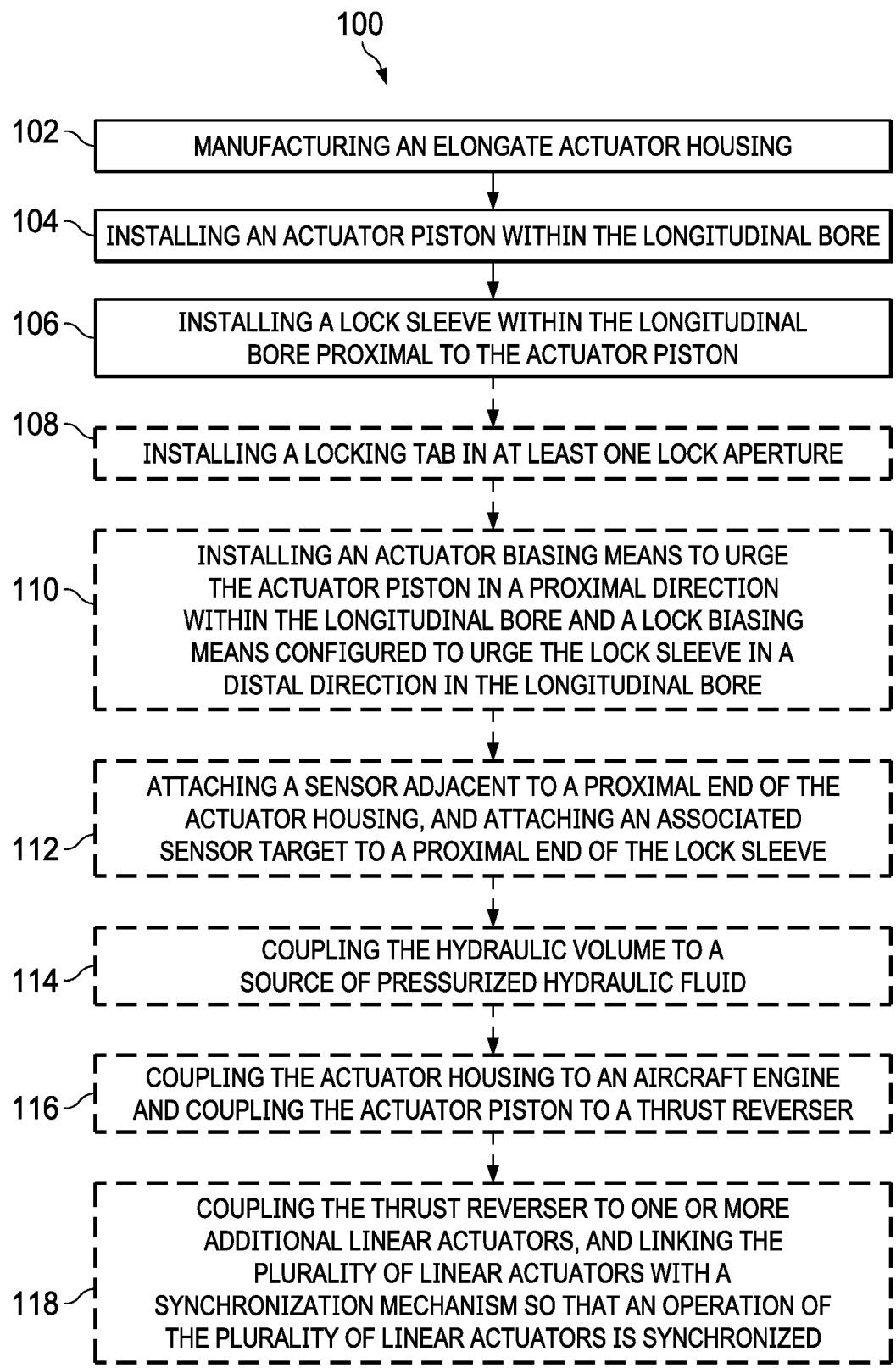
FIG. 15 is a flowchart depicting an illustrative method of manufacturing a locking linear actuator according to the present disclosure.

The manufacture of an illustrative locking linear actuator 20 may be accomplished according to flowchart 100 of FIG. 15. The method of manufacture includes manufacturing an elongate actuator housing, as shown at step 102 of flowchart 100.

The elongate actuator housing can be manufactured so as to define an internal longitudinal bore, an internal hydraulic space in fluid communication with the internal longitudinal bore, and a step on the inner surface of the internal longitudinal bore.

The method of manufacture further includes installing an actuator piston within the internal longitudinal bore as shown at step 104 of flowchart 100, so that the actuator piston is slidably moveable between a proximal retracted position and a distal extended position.

The install actuator piston can be configured so that at least a proximal portion of the actuator piston includes a cylindrical piston sidewall defining at least one lock aperture.

The method of manufacture further includes installing a lock sleeve within the internal longitudinal bore proximal to the actuator piston, shown at step 106 of flowchart 100, so that the lock sleeve is slidably moveable between a distal locking position and a proximal unlocked position, such that when the actuator piston is in the retracted position and the lock sleeve is in the locking position, a distal portion of the lock sleeve extends into a proximal portion of the actuator piston to prevent the actuator piston from leaving the retracted position.

The method of manufacture can further include installing a locking tab in the at least one lock aperture, as shown at step 108 of flowchart 100, such that the locking tab can translate radially within the lock aperture, and when the locking tab extends radially beyond an outer surface of the actuator piston the locking tab engages the step in the inner surface of the internal longitudinal bore and prevents the actuator piston from leaving the retracted position, and the locking tab is in fluid communication with the hydraulic space, such that an increase in hydraulic pressure within the hydraulic space would urge the locking tab inward within the lock aperture, and when the actuator piston is in the retracted position and the lock sleeve is in the locking position, a distal portion of the lock sleeve extends into a proximal portion of the actuator piston and prevents the locking tab from moving inwardly and disengaging from the step in the inner surface of the internal longitudinal bore, and an increase in hydraulic pressure within the internal hydraulic space will urge the lock sleeve in a proximal direction and urge the actuator piston in a distal direction.

When the resulting locking linear actuator is in use, by increasing the hydraulic pressure within the hydraulic space the lock sleeve will translate in a proximal direction, permitting the locking tab to move inwardly in the lock aperture under the urging of the increased hydraulic pressure and disengage from the step, permitting the actuator piston to move from the retracted position to the extended position under the urging of the increased hydraulic pressure.

The method of manufacture can optionally further include installing an actuator piston biasing mechanism to urge the actuator piston in a proximal direction within the internal longitudinal bore and a lock sleeve biasing mechanism configured to urge the lock sleeve in a distal direction in the internal longitudinal bore, as shown at step 110 of flowchart 100, such that upon a decrease in the hydraulic pressure in the hydraulic space the actuator piston will return to the retracted position, the lock sleeve will returned to the locking position, and the locking tab will engage with the step, locking the linear actuator.

The method of manufacture can alternatively and optionally further include attaching a sensor adjacent to a proximal end of the actuator housing, and attaching an associated sensor target to a proximal end of the lock sleeve, as shown at step 112 of flowchart 100, such that movement of the lock sleeve from one of the locking position and unlocked position to the other results in a movement of the sensor target that is detectable by the sensor and provides an indication that the linear actuator is locked or unlocked.

The method of manufacture can alternatively and optionally further include coupling the hydraulic space to a source of pressurized hydraulic fluid, as shown at step 114 of flowchart 100.

The method of manufacture can alternatively and optionally further include coupling the actuator housing to an aircraft engine and coupling the actuator piston to a thrust reverser, as shown at step 116 of flowchart 100.

The method of manufacture can alternatively and optionally further include coupling the thrust reverser to one or more additional linear actuators, and linking the plurality of linear actuators with a synchronization mechanism so that an operation of the plurality of linear actuators is synchronized, as shown at step 118 of flowchart 100.

(5) Illustrative Combinations and Additional Examples

This section describes additional aspects and features of the disclosed locking linear actuators, thrust reversers employing locking linear actuators, and methods of manufacturing locking linear actuators, presented without limitation as a series of paragraphs, some or all of which can be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A locking linear actuator, including an actuator housing defining an internal longitudinal bore; an actuator piston disposed in the internal longitudinal bore, the actuator piston being configured to slidably move between a proximal retracted position and a distal extended position; a lock sleeve disposed in the internal longitudinal bore, the lock sleeve being configured to slidably move between a distal locking position and a proximal unlocked position; where when the actuator piston is in the retracted position and the lock sleeve is in the locking position, a distal portion of the lock sleeve extends into a proximal portion of the actuator piston to prevent the actuator piston from leaving the retracted position.

A2. The locking linear actuator of paragraph A1, where at least a proximal portion of the actuator piston defines a cylindrical piston sidewall, with the cylindrical piston sidewall defining a lock aperture within the cylindrical piston sidewall; a locking tab is disposed in the lock aperture, such that the locking tab can translate radially within the lock aperture; and an inner surface of the internal longitudinal bore defines a step, where the step is positioned so that when the actuator piston is in the retracted position and the locking tab within the lock aperture extends beyond the cylindrical piston sidewall of the actuator piston the locking tab engages the step in the inner surface and the actuator piston is thereby prevented from leaving the retracted position.

A3. The locking linear actuator of paragraph A2, where when the actuator piston is in the retracted position and the lock sleeve is in the locking position, a distal portion of the lock sleeve extends into a proximal portion of the actuator piston and prevents the locking tab from moving inwardly and disengaging from the step in the inner surface of the internal longitudinal bore.

A4. The locking linear actuator of paragraph A3, where the actuator housing additionally defines a hydraulic space disposed between the actuator piston and the lock sleeve, such that an increase in hydraulic pressure within the hydraulic space urges the lock sleeve in a proximal direction and urges the actuator piston in a distal direction.

A5. The locking linear actuator of paragraph A4, where the hydraulic space is in fluid communication with a portion of the internal longitudinal bore defining the step, such that an increase in hydraulic pressure within the hydraulic space would urge the locking tab inward within the lock aperture; such that increasing the hydraulic pressure within the hydraulic space urges the lock sleeve in a proximal direction from the locking position to the unlocked position, thereby permitting the locking tab to move inwardly in the lock aperture under the urging of the increased hydraulic pressure and to disengage from the step, permitting the actuator piston to move from the retracted position to the extended position under the urging of the increased hydraulic pressure.

A6. The locking linear actuator of paragraph A5, further including an actuator piston biasing mechanism configured to urge the actuator piston in a proximal direction in the internal longitudinal bore, such that upon a decrease in the hydraulic pressure in the hydraulic space, the actuator piston is returned to the retracted position.

A7. The locking linear actuator of any of paragraphs A5-A6, further including a lock sleeve biasing mechanism configured to urge the lock sleeve in a distal direction in the internal longitudinal bore, such that upon a decrease in the hydraulic pressure in the hydraulic space, the lock sleeve is returned to the locking position.

A8. The locking linear actuator of any of paragraphs A5-A7, where the linear actuator is further configured so that returning the actuator piston to the retracted position and returning the lock sleeve to the locking position urges the locking tab radially outward to engage the step, thereby locking the actuator piston in the retracted position.

A9. The locking linear actuator of any of paragraphs A5-A8, where the hydraulic space disposed between the actuator piston and the lock sleeve further comprises a controllable hydraulic fluid source that is coupled to a synchronization mechanism that is in turn coupled to one or more additional linear actuators, where the synchronization mechanism is configured to coordinate a simultaneous operation of the linear actuators.

A10. The locking linear actuator of paragraph A9, where the controllable hydraulic fluid source includes a synchronization screw, and the synchronization mechanism includes a flexible-shafted cable that extends through an interior of the actuator piston and couples to the synchronization screw.

A11. The locking linear actuator of any of paragraphs A1-A10, further including a sensor disposed adjacent a proximal end of the actuator housing, the sensor configured to detect an associated sensor target that is coupled to a proximal end of the lock sleeve, such that movement of the lock sleeve from the locking position to the unlocked position is detectable by the sensor.

A12. The locking linear actuator of paragraph A11, where the sensor target includes a deactivation region that is detectable by the sensor when the lock sleeve is in the locked position, and a first activation region that is detectable by the sensor when the lock sleeve is in the unlocked position.

B1. A thrust reverser for an aircraft engine, including an aircraft engine nacelle including at least one deployable thrust reverser; at least one locking linear actuator within the aircraft engine nacelle coupled to the deployable thrust reverser such that deploying the thrust reverser includes extending the at least one linear actuator; where the linear actuator includes: an actuator housing defining an internal longitudinal bore; an actuator piston disposed in the internal longitudinal bore, the actuator piston being configured to slidably move between a proximal retracted position and a distal extended position; a lock sleeve disposed in the internal longitudinal bore, the lock sleeve being configured to slidably move between a distal locking position and a proximal unlocked position; where when the actuator piston is in the retracted position and the lock sleeve is in the locking position, a distal portion of the lock sleeve extends into a proximal portion of the actuator piston to prevent the actuator piston from leaving the retracted position.

B2. The thrust reverser of paragraph B1, where at least a proximal portion of the actuator piston defines a cylindrical piston sidewall, with the cylindrical piston sidewall defining a lock aperture within the cylindrical piston sidewall; a locking tab is disposed in the lock aperture, such that the locking tab can translate radially within the lock aperture; an inner surface of the internal longitudinal bore defines a step, where the step is positioned so that when the actuator piston is in the retracted position and the locking tab within the lock aperture extends beyond the cylindrical piston sidewall of the actuator piston the locking tab engages the step in the inner surface and the actuator piston is thereby prevented from leaving the retracted position; and when the actuator piston is in the retracted position and the lock sleeve is in the locking position, a distal portion of the lock sleeve extending into the proximal portion of the actuator piston prevents the locking tab from moving inwardly and disengaging from the step in the inner surface of the internal longitudinal bore.

B3. The thrust reverser of paragraph B2, where the actuator housing additionally defines a hydraulic space disposed between the actuator piston and the lock sleeve, such that an increase in hydraulic pressure within the hydraulic space urges the lock sleeve in a proximal direction and urge the actuator piston in a distal direction; and the hydraulic space is in fluid communication with a portion of the internal longitudinal bore defining the step, such that an increase in hydraulic pressure within the hydraulic space would urge the locking tab inward within the lock aperture; such that increasing the hydraulic pressure within the hydraulic space translates the lock sleeve in a proximal direction and the distal portion of the lock sleeve therefore moves from the locking position to the unlocked position, permitting the locking tab to move inwardly in the lock aperture under the urging of the increased hydraulic pressure and to disengage from the step, permitting the actuator piston to move from the retracted position to the extended position under the urging of the increased hydraulic pressure.

B4. The thrust reverser of paragraph B3, further including an actuator piston biasing spring configured to urge the actuator piston in a proximal direction within the internal longitudinal bore, such that upon a decrease in the hydraulic pressure in the hydraulic space the actuator piston is returned to the retracted position; and a lock sleeve biasing spring configured to urge the lock sleeve in a distal direction in the internal longitudinal bore, such that upon a decrease in the hydraulic pressure in the hydraulic space the lock sleeve is returned to the locking position.

B5. The thrust reverser of any of paragraphs B3-B4, further including a plurality of linear actuators, where each of the plurality of linear actuators includes a source of hydraulic fluid that is coupled to a synchronization mechanism that is coupled to each other linear actuator, so that the synchronization mechanism is configured to coordinate a simultaneous operation of the plurality of linear actuators when deploying the thrust reverser.

B6. The thrust reverser of paragraph B5, where the synchronization mechanism of each linear actuator includes a flexible-shafted cable that extends through an interior of each actuator piston and couples to a synchronization screw that controls hydraulic pressure within that linear actuator.

B7. The thrust reverser of any of paragraphs B1-B6, further including a sensor disposed adjacent to a proximal end of the actuator housing, the sensor configured to detect an associated sensor target that is coupled to a proximal end of the lock sleeve, such that movement of the lock sleeve from the locking position to the unlocked position is detectable by the sensor.

C1. A method of manufacturing a locking linear actuator, including manufacturing an elongate actuator housing, where the actuator housing defines an internal longitudinal bore; installing an actuator piston within the internal longitudinal bore, so that the actuator piston is slidably moveable between a proximal retracted position and a distal extended position; and installing a lock sleeve within the internal longitudinal bore proximal to the actuator piston, so that the lock sleeve is slidably moveable between a distal locking position and a proximal unlocked position; such that when the actuator piston is in the retracted position and the lock sleeve is in the locking position, a distal portion of the lock sleeve extends into a proximal portion of the actuator piston to prevent the actuator piston from leaving the retracted position.

C2. The method of paragraph C1, where the actuator housing further defines an internal hydraulic space in fluid communication with the internal longitudinal bore and a step on an inner surface of the internal longitudinal bore; where at least a proximal portion of the actuator piston includes a cylindrical piston sidewall defining at least one lock aperture; where the method further includes installing a locking tab in the at least one lock aperture, such that the locking tab can translate radially within the lock aperture, and when the locking tab extends radially beyond an outer surface of the actuator piston the locking tab engages the step in the inner surface of the internal longitudinal bore and prevents the actuator piston from leaving the retracted position, and the locking tab is in fluid communication with the hydraulic space, such that an increase in hydraulic pressure within the hydraulic space would urge the locking tab inward within the lock aperture; where when the actuator piston is in the retracted position and the lock sleeve is in the locking position, the distal portion of the lock sleeve extended into the proximal portion of the actuator piston prevents the locking tab from moving inwardly and disengaging from the step in the inner surface of the internal longitudinal bore; and an increase in hydraulic pressure within the internal hydraulic space will urge the lock sleeve in a proximal direction and urge the actuator piston in a distal direction; such that by increasing the hydraulic pressure within the hydraulic space the lock sleeve will translate in a proximal direction, permitting the locking tab to move inwardly in the lock aperture under the urging of the increased hydraulic pressure and disengage from the step, permitting the actuator piston to move from the retracted position to the extended position under the urging of the increased hydraulic pressure.

C3. The method of paragraph C2, further including installing an actuator piston biasing mechanism to urge the actuator piston in a proximal direction within the internal longitudinal bore, and a lock sleeve biasing mechanism configured to urge the lock sleeve in a distal direction in the internal longitudinal bore, such that upon a decrease in the hydraulic pressure in the hydraulic space the actuator piston will return to the retracted position, the lock sleeve will returned to the locking position, and the locking tab will engage with the step, locking the linear actuator.

C4. The method of any of paragraphs C2-C3, further including attaching a sensor adjacent to a proximal end of the actuator housing, and attaching an associated sensor target to a proximal end of the lock sleeve, such that movement of the lock sleeve from one of the locking position and unlocked position to the other of the locking position and unlocked position results in a movement of the sensor target that is detectable by the sensor and provides an indication that the linear actuator is locked or unlocked.

C5. The method of any of paragraphs C2-C4, further including coupling the hydraulic space to a source of pressurized hydraulic fluid.

C6. The method of paragraph C5, further including coupling the actuator housing to an aircraft engine and coupling the actuator piston to a thrust reverser.

C7. The method of paragraph C6, further including coupling the thrust reverser to one or more additional linear actuators, and linking each of the coupled linear actuators with a synchronization mechanism so that an operation of the coupled linear actuators is synchronized.

(6) Advantages, Features, and Benefits

The locking linear actuators disclosed herein, thrust reverser systems that can include one or more of the disclosed locking linear actuators, and methods of manufacturing the disclosed locking linear actuators, provide significant benefits when compared to prior linear actuator designs, particularly with respect to the actuation of aircraft engine thrust reversers.

The presently disclosed locking linear actuators require fewer parts, and cheaper parts, than existing linear actuators. The new actuators exhibit reduced internal wear, and the improved mechanism is simpler to manufacture than previous actuator designs. For example, the actuator cylinder is slimmer and simpler, and does not have to be machined from a large initial piece of stock, reducing costs. Like the actuator cylinder, the lock sleeve of the disclosed locking actuator is smaller and more streamlined than in previous linear actuators, resulting in savings on materials and a decrease in overall actuator size and weight, which results in fuel savings.

The slimmer and smaller geometry of the disclosed linear actuators also permits them to be fitted into aircraft that could not accommodate the larger existing linear actuators, or they will require smaller housings when installed.

The mechanism for lock engagement in the disclosed linear actuators is simpler, but both stronger and more reliable than existing locking mechanisms. The new locking mechanism additionally eliminates sources of potential wear that were created in previous linear actuators. The improved lock sensor system provides both a visual confirmation of lock engagement at the actuator itself, as well as an electronic confirmation within the aircraft cockpit.

Further, the disclosed linear actuators are configured so that disengagement of the lock sleeve, unlocking the linear actuator, can occur very quickly, and the lock sleeve becomes completely disengaged before the actuator piston can begins to move.

The presently described locking linear actuators are smaller, simpler in operation and manufacture, provide a more robust lock engagement, and are less expensive than previously disclosed locking linear actuators, particularly for those used in thrust reverser systems.

(7) Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A locking linear actuator, comprising:
   an actuator housing defining an internal longitudinal bore;
   an actuator piston disposed in the internal longitudinal bore, the actuator piston being configured to slidably move between a proximal retracted position and a distal extended position;
   a lock sleeve disposed in the internal longitudinal bore, the lock sleeve being configured to slidably move between a distal locking position and a proximal unlocked position; and
   an actuator piston biasing mechanism configured to urge the actuator piston in a proximal direction in the internal longitudinal bore, toward the retracted position;
   wherein
   when the actuator piston is in the retracted position and the lock sleeve is in the locking position, a distal portion of the lock sleeve extends into a proximal portion of the actuator piston to prevent the actuator piston from leaving the retracted position.

2. The locking linear actuator of claim 1, wherein:
   at least a proximal portion of the actuator piston defines a cylindrical piston sidewall, with the cylindrical piston sidewall defining a lock aperture within the cylindrical piston sidewall;
   a locking tab is disposed in the lock aperture, such that the locking tab can translate radially within the lock aperture; and
   an inner surface of the internal longitudinal bore defines a step, where the step is positioned so that when the actuator piston is in the retracted position and the locking tab within the lock aperture extends beyond the cylindrical piston sidewall of the actuator piston the locking tab engages the step in the inner surface and the actuator piston is thereby prevented from leaving the retracted position.

3. The locking linear actuator of claim 2, wherein when the actuator piston is in the retracted position and the lock sleeve is in the locking position, a distal portion of the lock sleeve extends into a proximal portion of the actuator piston and prevents the locking tab from moving inwardly and disengaging from the step in the inner surface of the internal longitudinal bore.

4. The locking linear actuator of claim 3, wherein the actuator housing additionally defines a hydraulic space disposed between the actuator piston and the lock sleeve, such that an increase in hydraulic pressure within the hydraulic space urges the lock sleeve in a proximal direction and urges the actuator piston in a distal direction.

5. The locking linear actuator of claim 4, wherein the hydraulic space is in fluid communication with a portion of the internal longitudinal bore defining the step, such that an increase in hydraulic pressure within the hydraulic space would urge the locking tab inward within the lock aperture;
   such that increasing the hydraulic pressure within the hydraulic space urges the lock sleeve in a proximal direction from the locking position to the unlocked position, thereby permitting the locking tab to move inwardly in the lock aperture under the urging of the increased hydraulic pressure and to disengage from the step, permitting the actuator piston to move from the retracted position to the extended position under the urging of the increased hydraulic pressure.

6. The locking linear actuator of claim 5, wherein the actuator piston biasing mechanism is configured to urge the actuator piston such that upon a decrease in the hydraulic pressure in the hydraulic space, the actuator piston is returned to the retracted position.

7. The locking linear actuator of claim 5, further comprising a lock sleeve biasing mechanism configured to urge the lock sleeve in a distal direction in the internal longitudinal bore, such that upon a decrease in the hydraulic pressure in the hydraulic space, the lock sleeve is returned to the locking position.

8. The locking linear actuator of claim 5, wherein the linear actuator is further configured so that returning the actuator piston to the retracted position and returning the lock sleeve to the locking position urges the locking tab radially outward to engage the step, thereby locking the actuator piston in the retracted position.

9. The locking linear actuator of claim 5, wherein the hydraulic space disposed between the actuator piston and the lock sleeve further comprises a controllable hydraulic fluid source that is coupled to a synchronization mechanism that is in turn coupled to one or more additional linear actuators, wherein the synchronization mechanism is configured to coordinate a simultaneous operation of the linear actuators.

10. The locking linear actuator of claim 1, further comprising a sensor disposed adjacent a proximal end of the actuator housing, the sensor configured to detect an associated sensor target that is coupled to a proximal end of the lock sleeve, such that movement of the lock sleeve from the locking position to the unlocked position is detectable by the sensor.

11. The locking linear actuator of claim 10, wherein the sensor target includes a deactivation region that is detectable by the sensor when the lock sleeve is in the locked position, and a first activation region that is detectable by the sensor when the lock sleeve is in the unlocked position.

12. The locking linear actuator of claim 1, wherein:
   the actuator housing additionally defines a hydraulic space disposed between the actuator piston and the lock sleeve, such that an increase in hydraulic pressure within the hydraulic space urges the lock sleeve in a proximal direction and urges the actuator piston in a distal direction; and
   the actuator piston biasing mechanism urges the actuator piston such that, upon a decrease in the hydraulic pressure in the hydraulic space, the actuator piston is returned to the retracted position.

13. A thrust reverser for an aircraft engine, comprising:
   an aircraft engine nacelle including at least one deployable thrust reverser;
   at least one locking linear actuator within the aircraft engine nacelle coupled to the deployable thrust reverser such that deploying the thrust reverser includes extending the at least one linear actuator;
   where the linear actuator includes:
   an actuator housing defining an internal longitudinal bore;
   an actuator piston disposed in the internal longitudinal bore, the actuator piston being configured to slidably move between a proximal retracted position and a distal extended position;
   a lock sleeve disposed in the internal longitudinal bore, the lock sleeve being configured to slidably move between a distal locking position and a proximal unlocked position; and
   a sensor disposed adjacent to a proximal end of the actuator housing, the sensor configured to detect an associated sensor target that is coupled to a proximal end of the lock sleeve, such that movement of the lock sleeve from the locking position to the unlocked position is detectable by the sensor;

wherein when the actuator piston is in the retracted position and the lock sleeve is in the locking position, a distal portion of the lock sleeve extends into a proximal portion of the actuator piston to prevent the actuator piston from leaving the retracted position; and wherein the sensor target includes a deactivation region and an activation region.

14. The thrust reverser of claim 13, wherein:

at least a proximal portion of the actuator piston defines a cylindrical piston sidewall, with the cylindrical piston sidewall defining a lock aperture within the cylindrical piston sidewall;

a locking tab is disposed in the lock aperture, such that the locking tab can translate radially within the lock aperture;

an inner surface of the internal longitudinal bore defines a step, where the step is positioned so that when the actuator piston is in the retracted position and the locking tab within the lock aperture extends beyond the cylindrical piston sidewall of the actuator piston the locking tab engages the step in the inner surface and the actuator piston is thereby prevented from leaving the retracted position; and when the actuator piston is in the retracted position and the lock sleeve is in the locking position, a distal portion of the lock sleeve extending into the proximal portion of the actuator piston prevents the locking tab from moving inwardly and disengaging from the step in the inner surface of the internal longitudinal bore.

15. The thrust reverser of claim 14, wherein:

the actuator housing additionally defines a hydraulic space disposed between the actuator piston and the lock sleeve, such that an increase in hydraulic pressure within the hydraulic space urges the lock sleeve in a proximal direction and urge the actuator piston in a distal direction; and the hydraulic space is in fluid communication with a portion of the internal longitudinal bore defining the step, such that an increase in hydraulic pressure within the hydraulic space would urge the locking tab inward within the lock aperture;

such that increasing the hydraulic pressure within the hydraulic space translates the lock sleeve in a proximal direction and the distal portion of the lock sleeve therefore moves from the locking position to the unlocked position, permitting the locking tab to move inwardly in the lock aperture under the urging of the increased hydraulic pressure and to disengage from the step, permitting the actuator piston to move from the retracted position to the extended position under the urging of the increased hydraulic pressure.

16. The thrust reverser of claim 15, further comprising an actuator piston biasing spring configured to urge the actuator piston in a proximal direction within the internal longitudinal bore, such that upon a decrease in the hydraulic pressure in the hydraulic space the actuator piston is returned to the retracted position; and a lock sleeve biasing spring configured to urge the lock sleeve in a distal direction in the internal longitudinal bore, such that upon a decrease in the hydraulic pressure in the hydraulic space the lock sleeve is returned to the locking position.

17. The thrust reverser of claim 15, further comprising a plurality of linear actuators, wherein each of the plurality of linear actuators includes a source of hydraulic fluid that is coupled to a synchronization mechanism that is coupled to each other linear actuator, so that the synchronization mechanism is configured to coordinate a simultaneous operation of the plurality of linear actuators when deploying the thrust reverser.

18. The thrust reverser of claim 17, wherein the synchronization mechanism of each linear actuator includes a flexible-shafted cable that extends through an interior of each actuator piston and couples to a synchronization screw that controls hydraulic pressure within that linear actuator.

19. A method of manufacturing a locking linear actuator, comprising:

manufacturing an elongate actuator housing, where the actuator housing defines an internal longitudinal bore;

installing an actuator piston within the internal longitudinal bore, so that the actuator piston is slidably moveable between a proximal retracted position and a distal extended position;

installing an actuator piston biasing mechanism configured to urge the actuator piston in a proximal direction in the internal longitudinal bore, toward the retracted position; and installing a lock sleeve within the internal longitudinal bore proximal to the actuator piston, so that the lock sleeve is slidably moveable between a distal locking position and a proximal unlocked position; such that when the actuator piston is in the retracted position and the lock sleeve is in the locking position, a distal portion of the lock sleeve extends into a proximal portion of the actuator piston to prevent the actuator piston from leaving the retracted position.

20. The method of claim 19, further comprising installing a sensor adjacent a proximal end of the actuator housing, the sensor configured to detect an associated sensor target that is coupled to a proximal end of the lock sleeve, such that movement of the lock sleeve from the locking position to the unlocked position is detectable by the sensor.

* * * * *